June 12, 1928.  J. W. STUDEBAKER  1,673,166

EDUCATIONAL DEVICE

Filed Feb. 7, 1927

Witness
L. F. Sandberg

Inventor
John W. Studebaker
by Bair & Freeman Attorneys

Patented June 12, 1928.

1,673,166

UNITED STATES PATENT OFFICE.

JOHN WARD STUDEBAKER, OF DES MOINES, IOWA.

EDUCATIONAL DEVICE.

Application filed February 7, 1927. Serial No. 166,482.

My invention has to do with educational devices in which cards are provided, bearing on their faces incomplete subject matter and on their opposite faces completing subject matter.

More particularly, it is the purpose of the present invention to provide a device of the kind under consideration comprising a card having printed or otherwise impressed or placed thereon a series of educational exercises comprising incomplete subject matter, these exercises being preferably arranged in lines or columns. Along one edge of the card, I arrange subject matter arranged to complete the exercise on the opposite side of the card.

Another object of my invention herein disclosed is to provide such a device, which can be changed slightly for carrying out a great variety of educational exercises and tests.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

I will first describe the cards embodying my invention and then explain the manner of use thereof and call attention to some of the advantages of such an apparatus.

Figure 1:
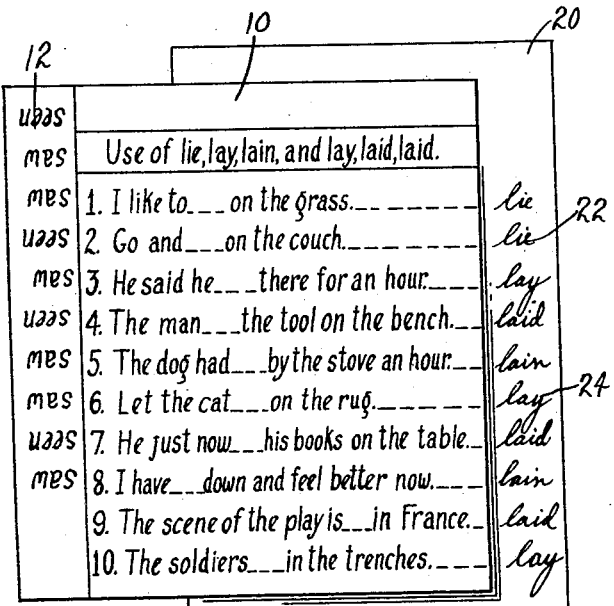
Figure 1 is a plan view of a card illustrating an educational device embodying my invention.

In Figure 1, I have shown a card indicated generally by the reference numeral 10. The card 10 has arranged thereon a series of educational exercises, each comprising certain incomplete subject matter, as shown. These exercises, as illustrated, are in columns or lines.

In Figure 1, the exercises are shown in lines.

Preferably at the left-hand side of the card, as illustrated in Figure 1, I have shown a margin 12.

Figure 2:
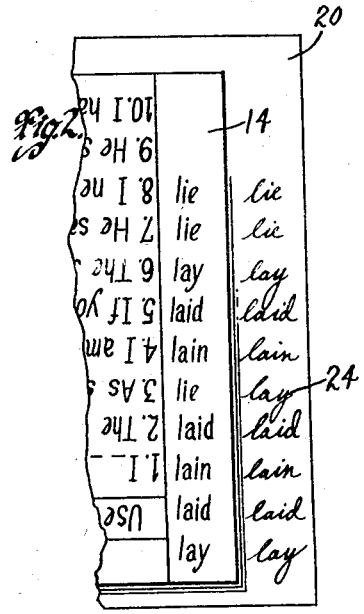
Figure 2 is a similar view of the reverse side of the same card.

In Figure 2, I have shown a portion of the reverse side of the card shown in Figure 1. On the reverse side of the card, I arrange educational exercises in the same manner, and the reverse side has a similar margin 14.

Referring now to Figure 1, which shows the obverse side of the card, it will be noted that in the margin 12, I place subject matter for completing the exercises on the reverse side of the card. On the reverse of the card, I have shown in the margin 14 subject matter for completing the incomplete exercises on the obverse side of the card.

The exercises on one side of the card and the incomplete subject matter on the same side may be arranged as shown, so that the exercises are right-side up when the completing subject matter is wrong side up and vice versa.

Figure 3:
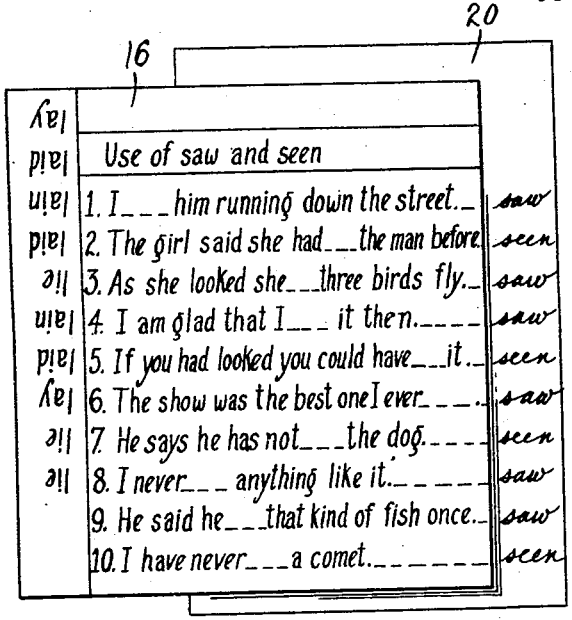
Figure 3 is a similar view of a card having a different set of incomplete subject matter.

In Figure 3, I have simply shown another series of exercises on a similar card 16.

Figure 4:
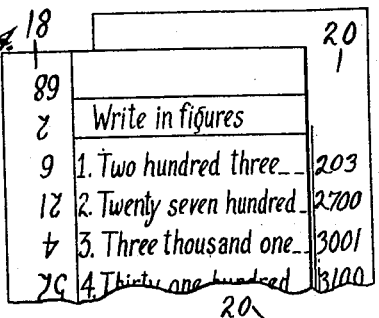
Figure 4 is a fragmental plan view of a portion of the obverse side of a card, illustrating the use of another type of the exercise.
Figure 5:
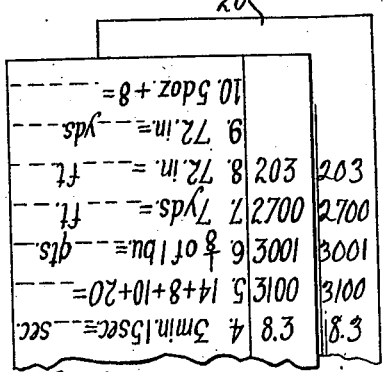
Figure 5 is a plan view of the reverse side of the card shown in Figure 4.

In Figure 4, I have shown on a card 18 a series of mathematical exercises.

I will now explain the manner of use of the card shown in Figures 1 and 2.

The pupil puts the card 10 on a sheet of paper 20. He reads the incomplete exercise, as for example the first one on the card, which is a language exercise intended for training in the use of "lie", "lay", "lain", and "laid".

When a word is omitted from the exercise, the pupil writes adjacent to the edge of the card on the sheet of paper 20 the completing subject matter, which in the case of the first exercise would be "lie". The completing subject matter for the other exercises is similarly written on the sheet of paper 20 adjacent to the edge of the card 10 in alignment with the appropriate lines or columns on the sheet 10.

When the pupil has gone through all the exercises and has written down on the sheet 20 the various words or other matter necessary to complete the exercises, he or she simply turns the card 10 over, whereupon the matter in the margin 14 on the reverse side of the card may be placed adjacent to the matter written by the pupil on the sheet 20 and the pupil may thus check and compare his work with the correct completing subject matter in the margin 14 on such reverse side.

An apparatus of this kind has a large number of advantages. It trains pupils individually rather than by classes. By the use of such devices, the teacher may handle a large class and yet each pupil can make progress and complete the exercises as fast as his individual capacity will permit.

By arranging the completing matter upsidedown with relation to the exercises on the same side of the card, it will be seen that the completing subject matter will be less likely to distract the attention of the pupil from the exercises.

In Figure 2, I have shown the reverse side of the sheet of the card after the card has been turned over and laid adjacent to the matter written by the pupil on the sheet of paper 20. The completing subject matter on the reverse may be easily arranged adjacent to the matter arranged by the pupil.

The ease with which the pupil can check his work is seen by one of the illustrations. In Figure 1, I have shown, as at 22, a column of completing subject matter written by the pupil. The word "lay" indicated at 24 is incorrect. When the card is turned over in the manner indicated, it will be noted that the pupil can very quickly and easily check the error made at 24.

The present device differs from my device shown in my patent issued February 15, 1927, No. 1,617,657, in that the present apparatus can be made much cheaper, since it eliminates the necessity for forming a die and cutting holes in the cards.

The present device has one advantage from the standpoint of educational training over the device of my prior patent in that the present device affords training in properly aligning the completing subject matter with the completed subject matter and in properly spacing the completing subject matter written by the pupil, which training was not afforded to the same degree by my prior device.

It is my purpose in this application to cover the apparatus where the exercises are written, printed or otherwise impressed on the cards.

I claim as my invention:

1. An educational device comprising a sheet having on each side incomplete exercises and having on each side a margin bearing the completing subject-matter for the incomplete exercises on the opposite side, whereby the sheet may be placed upon a piece of paper and the completing subject-matter for the respective exposed incomplete exercise on the sheet may be written on the paper in alignment with the exposed incomplete exercises on the sheet, the sheet turned over and the completed subject-matter on the paper checked and compared with the corresponding completing subject-matter on the sheet.

2. An educational device comprising a sheet having on each side incomplete exercises and having on each side a margin bearing the completing subject-matter for the incomplete exercises on the opposite side, the completing subject-matter on each side of the sheet being upside-down with relation to the incomplete subject-matter on that side, whereby the sheet may be placed upon a piece of paper and the completing subject-matter for the respective exposed incomplete exercises on the sheet may be written on the paper in alignment with the exposed incomplete exercises on the sheet, the sheet turned over and the completed subject-matter on the paper checked and compared with the corresponding completing subject-matter on the sheet.

Des Moines, Iowa, January 29, 1927.

JOHN WARD STUDEBAKER.